(12) United States Patent
Wang

(10) Patent No.: US 6,970,645 B1
(45) Date of Patent: Nov. 29, 2005

(54) POND HEATER WITH WATER PUMP

(75) Inventor: Yu-Chin Wang, Taipei (TW)

(73) Assignee: Eiko Electric Products Corp., Taipei (TW)

( * ) Notice: Subject to any disclaimer, the term of this patent is extended or adjusted under 35 U.S.C. 154(b) by 0 days.

(21) Appl. No.: 11/033,286

(22) Filed: Jan. 12, 2005

(51) Int. Cl.⁷ ................................. H05B 3/80
(52) U.S. Cl. ..................................... 392/499
(58) Field of Search ......................... 392/499

(56) References Cited

U.S. PATENT DOCUMENTS

| | | | |
|---|---|---|---|
| 2,454,091 A * | 11/1948 | Rietz | 392/499 |
| 4,599,973 A * | 7/1986 | Ward | 119/73 |
| 6,778,763 B1 * | 8/2004 | Reusche et al. | 392/499 |

* cited by examiner

*Primary Examiner*—Thor B. Campbell
(74) *Attorney, Agent, or Firm*—Troxell Law Office, PLLC

(57) ABSTRACT

A pond heater with a water pump, the housing of the heater is provided with a holed seat for receiving the water pump; cold water enters the pond heater via a water inlet, and hot water generated by the heater is discharged from a water outlet to create convection in the pond to increase effect of ice removing.

4 Claims, 5 Drawing Sheets

POND HEATER WITH WATER PUMP

BACKGROUND OF THE INVENTION

1. Field of the Invention

The present invention is related to a pond heater with a water pump, and especially to a heater with a water pump provided in a pond-heater housing, it is used to generate convection of the water in the pond to increase the effect of ice removing.

2. Description of the Prior Art

In order to keep the temperature of the water in the pond at a higher value in winter to prevent water freezing or being frozen to death of the creatures in the pond, generally a pond heater is added to the pond. Referring to FIG. 1, the deepest position of a pond 90 is provided with a pond heater 91. The pond heater 91 has a weight 93, such as a brick, tied thereon with a rope 92 for positioning. A plug 95 on an electric line 94 of the pond heater 91 is inserted into a socket to get electric power; hence the pond heater 91 generates heat to prevent being overly low of the temperature in the water.

Referring to FIG. 2, a conventional heater 91 is shown and clamps a heat emitting device (not shown) in a sealed state between an upper and a lower housing 911, 912 made of plastic (such as ABS) for generating heat. The electric line 94 is extended out of the lower housing 912, and an indicating lamp 913 is provided at the centric position of the upper housing 911.

In the embodiment depicted in FIG. 1, an aeration pump 96 is added, a tailing end of a pipeline 97 is extended to be under the heater 91, the water of the pond is stirred to increase diffusion of the heat energy generate by the heater 91.

By virtue that the pond heater 91 is used in winter that is cold and may render water to be frozen, sometimes ice can form in the pipeline 97 of the aeration pump 96, so that the effect that the aeration pump 96 pumps air into the pond may disappear, and is unable to diffuse the heat energy generated by the heater 91, thereby an improvement is necessary.

SUMMARY OF THE INVENTION

The primary object of the present invention is to provide a pond heater with a water pump, the pond heater is provided in its lower housing a holed seat for receiving the water pump, cold water of the pond can flow into the heater, and hot water generated by the heater can be discharged from a water outlet to create convection in the pond to increase effect of ice removing.

Another object of the present invention is to provide a pond heater with a water pump, wherein the water pump is composed of a motor and an output axle with rotative blades thereon; the water pump is sealed in the holed seat with a cover.

The present invention will be apparent in its features and effects of operation after reading the detailed description of the preferred embodiments thereof in reference to the accompanying drawings.

DETAILED DESCRIPTION OF THE PREFERRED EMBODIMENT

The pond heater with a water pump of the present invention mainly is improved on its lower housing; its upper housing and its heat emitting device are same as those of the prior art.

Figure 1:
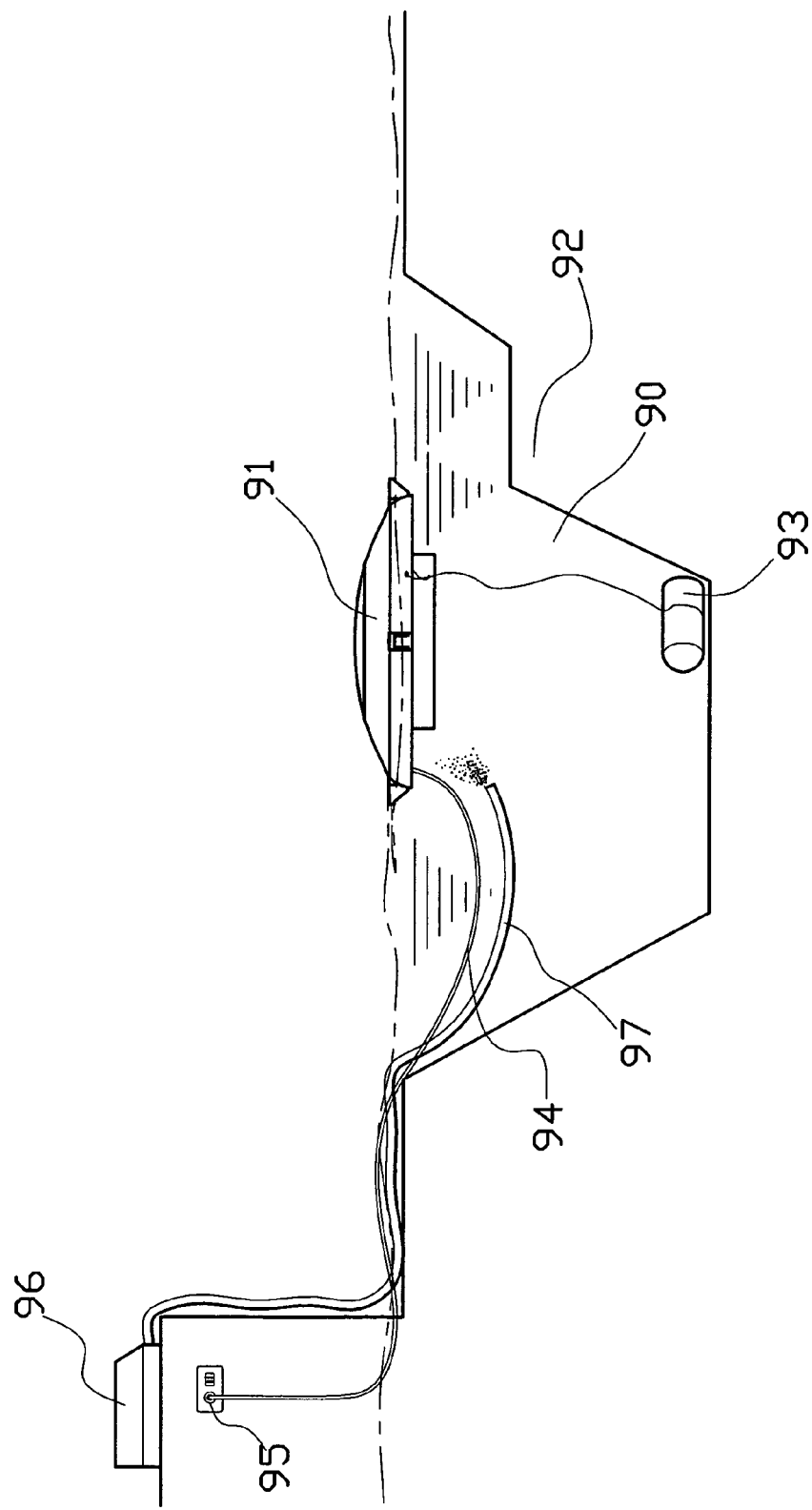
FIG. 1 is a schematic view showing use of a conventional pond heater.
Figure 2:
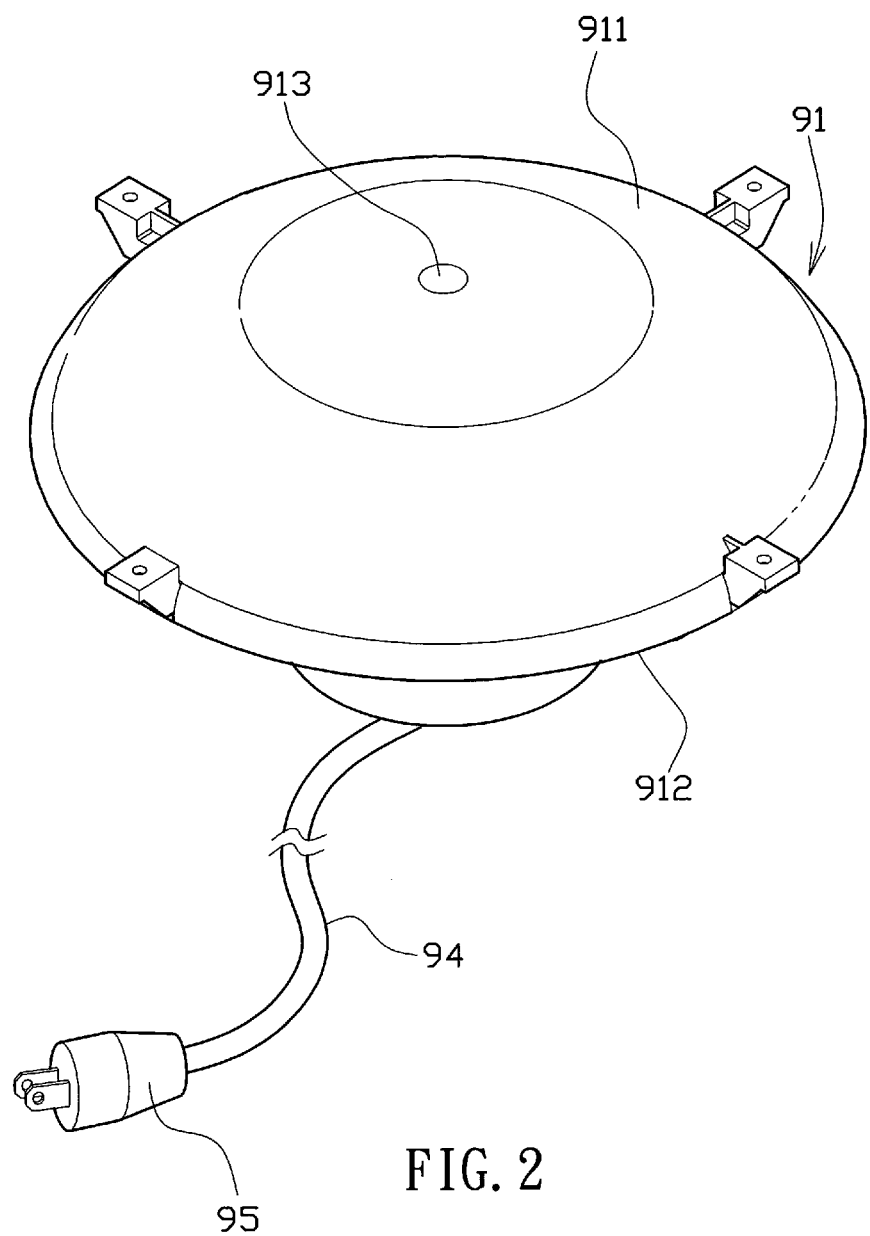
FIG. 2 is a perspective view showing the appearance of the conventional pond heater.
Figure 3:
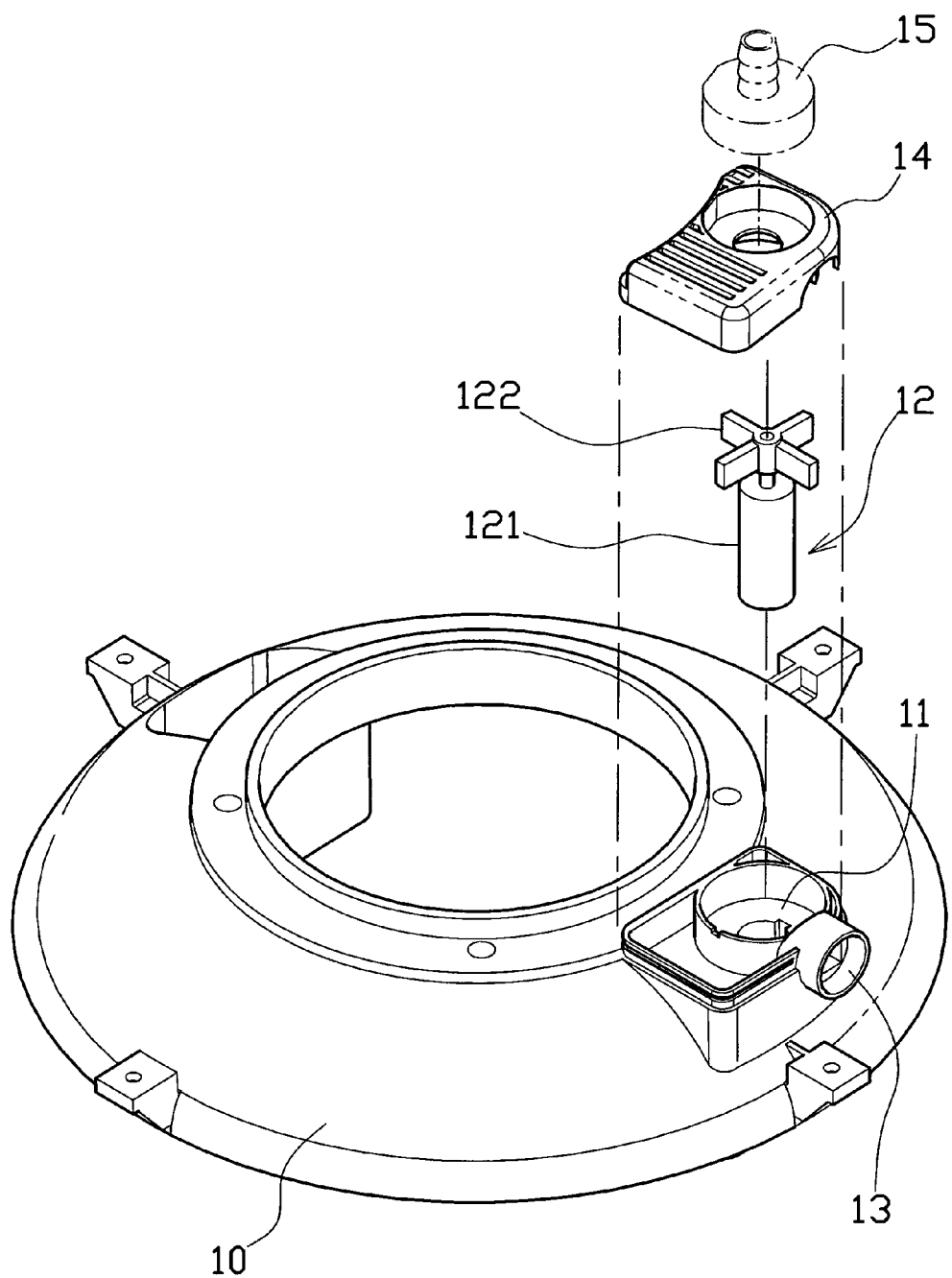
FIG. 3 is an anatomic perspective view of the improved lower housing of the present invention.
Figure 4:
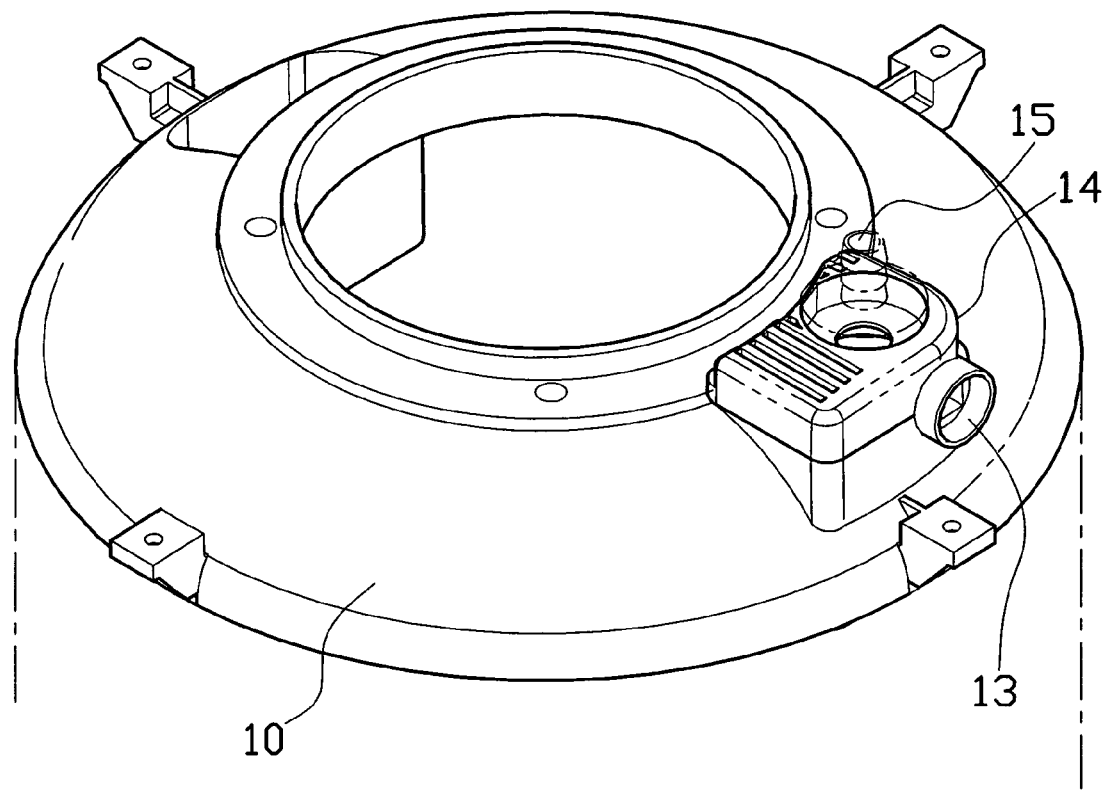
FIG. 4 is a assembled perspective view of FIG. 3.

Referring to FIGS. 3 and 4, the lower housing 10 is formed thereon a holed seat 11 for receiving the water pump 12. The water pump 12 mainly is composed of a motor 121 and an output axle with rotative blades 122.

The holed seat 11 has on its outer periphery a water inlet 13, cold water enters the pond heater via the water inlet 13 to be heated.

A cover 14 covers the holed seat 11, so that the water pump 12 is sealed in the holed seat 11. The cover 14 is connected with a water outlet 15 which is perpendicular to the water inlet 13 in order that hot water generated by the heater can be discharged from the water outlet 15.

Figure 5:
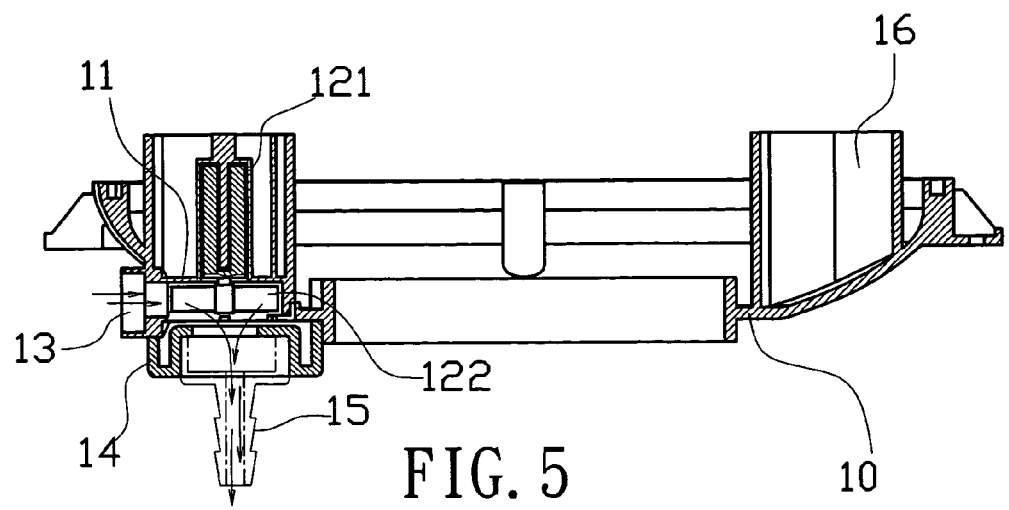
FIG. 5 is a sectional view taken from FIG. 4.
Figure 6:
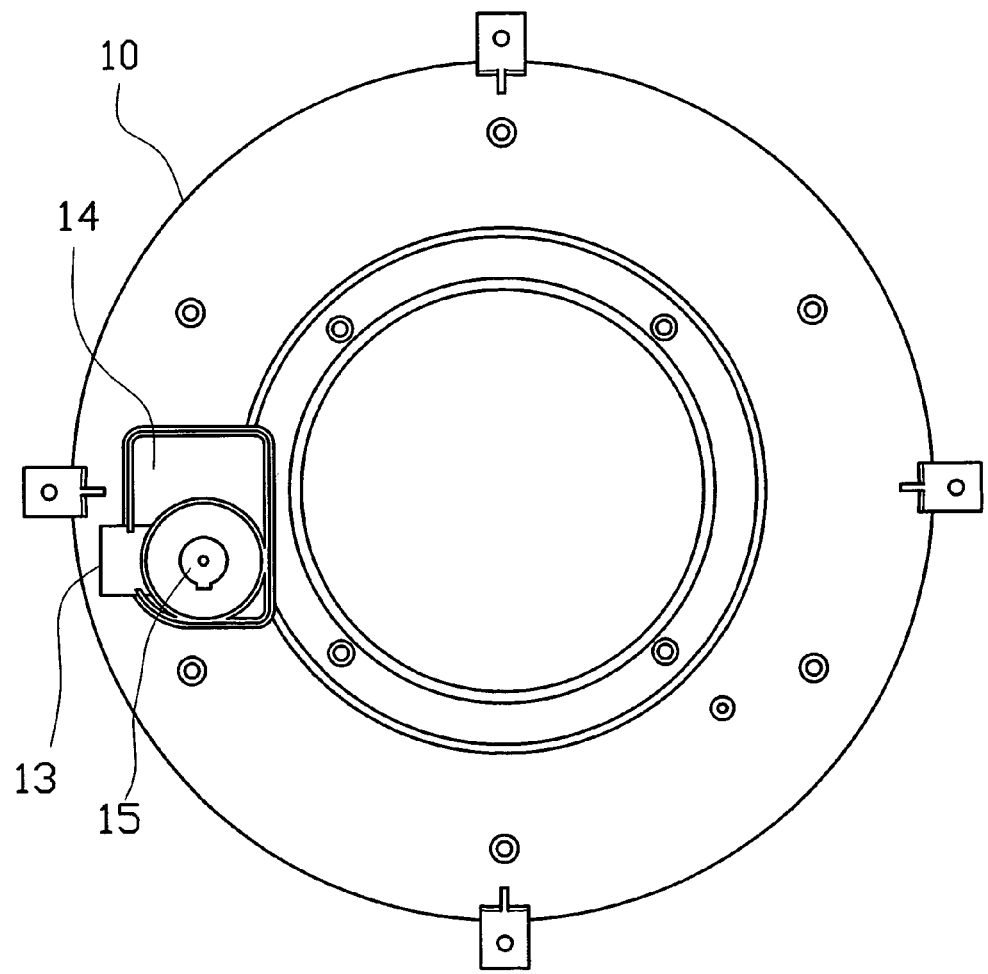
FIG. 6 is a plain view taken from FIG. 4.

Further referring to FIG. 5 showing the action of the present invention, when the water pump 12 gets electric power, its motor 121 rotates the rotative blades 122, so that cold water in the water inlet 13 can be pumped down into the lower housing 10 and is heated by the heat emitting device to flow out of the water outlet 15 of the cover 14. The arrows depicted in FIG. 5 represent the directions of water flow.

With such a designing of the lower housing 10, water in the pond will create convection to increase the effect of ice removing. Moreover, by virtue that the water pump 12 is provided in the lower housing 10 of the heater, the heater will generate heat, it is not probable that water freezes at the water inlet 13 or the water outlet 15 to induce blocking, the efficiency of use of the present invention is much better than the prior art.

The present invention is improved only on the lower housing, other parts of the heater are same as those of the prior art, manufacturing of the present invention is very smooth.

Referring to FIG. 5, at a position on the lower housing 10 in opposition diametrically to the holed seat 11, the lower housing 10 is formed therein an opening 16, the opening 16 can be filled therein with a weight equal by weight to the water pump 12 for the purpose of keeping balance of the entire heater.

Accordingly, the pond heater with a water pump of the present invention renders higher of the effect of ice removing of the heater.

Having now particularly described and ascertained the novelty and improvement of my invention and in what manner the same is to be performed, what we claim will be declared in the claims followed.

What is claimed is:

1. A pond heater with a water pump, said heater has an upper and a lower housing with a heat emitting device between said upper and said lower housings, an electric line is extended out of a centric position of said lower housing to get electric power, said heat emitting device generates heat for of ice removing; said heater is characterized in that: said lower housing is provided with a holed seat for receiving said water pump, and is provided with an water inlet as well as an water outlet, said water pump is operated to pump cold water in a pond from said water inlet into said lower housing, said water is heated to generate hot water that flows out from said water outlet into said pond to generate convection of said water in said pond.

2. The pond heater with a water pump as in claim 1, wherein said holed seat is covered with a cover, so that said water pump is sealed in said holed seat; said water inlet is provided on an outer periphery of said holed seat, said water outlet is perpendicular to said water inlet and is provided on said cover.

3. The pond heater with a water pump as in claim 1, wherein said water pump is composed of a motor and an output axle with rotative blades thereon.

4. The pond heater with a water pump as in claim 1, wherein at a position on said lower housing in opposition diametrically to said holed seat, said lower housing is formed therein an opening, said opening is filled therein with a weight equal by weight to said water pump.

* * * * *